United States Patent
Kim et al.

(10) Patent No.: US 9,521,078 B2
(45) Date of Patent: Dec. 13, 2016

(54) METHOD AND APPARATUS FOR CONTROLLING CONGESTION OF NETWORK EQUIPMENT

(71) Applicant: Electronics and Telecommunications Research Institute, Daejeon (KR)

(72) Inventors: Hak Suh Kim, Daejeon (KR); Ki Cheol Jeon, Daejeon (KR); Byungjun Ahn, Daejeon (KR); Kyeong Ho Lee, Daejeon (KR); Hae Sook Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 257 days.

(21) Appl. No.: 14/147,883

(22) Filed: Jan. 6, 2014

(65) Prior Publication Data
US 2014/0307558 A1    Oct. 16, 2014

(30) Foreign Application Priority Data
Apr. 10, 2013    (KR) .................. 10-2013-0038925

(51) Int. Cl.
*H04L 12/803* (2013.01)
*H04L 12/823* (2013.01)

(52) U.S. Cl.
CPC ............. *H04L 47/125* (2013.01); *H04L 47/32* (2013.01)

(58) Field of Classification Search
None
See application file for complete search history.

(56) References Cited

U.S. PATENT DOCUMENTS

| | | | |
|---|---|---|---|
| 6,442,144 B1 * | 8/2002 | Hansen | H04L 29/12018 370/255 |
| 7,724,660 B2 | 5/2010 | Segel | |
| 2007/0183332 A1 | 8/2007 | Oh et al. | |
| 2012/0110162 A1 | 5/2012 | Dubovik et al. | |

FOREIGN PATENT DOCUMENTS

| | | |
|---|---|---|
| KR | 10-0447082 B1 | 9/2004 |
| KR | 10-0604197 B1 | 7/2006 |
| KR | 10-0757872 B1 | 9/2007 |

* cited by examiner

*Primary Examiner* — Kwang B Yao
*Assistant Examiner* — Adam Duda
(74) *Attorney, Agent, or Firm* — NSIP Law

(57) ABSTRACT

A method of controlling congestion of network equipment that connects networks with each other, includes determining a type of congestion based on a location of the network equipment; and identifying a network connection section having a strong possibility of occurrence of congestion based on the type of congestion, and setting a critical congestion bandwidth that is used to determine the occurrence of congestion. Further, the method includes identifying users required for equal distribution of traffic upon occurrence of congestion based on the critical congestion bandwidth; and equally distributing traffic to the identified users based on the critical congestion bandwidth, and then dropping an excess of arriving traffic over the equally distributed traffic, thereby performing avoidance of the congestion.

14 Claims, 4 Drawing Sheets

METHOD AND APPARATUS FOR CONTROLLING CONGESTION OF NETWORK EQUIPMENT

CROSS-REFERENCE TO RELATED APPLICATION

The present invention claims priority of Korean Patent Application No. 10-2013-0038925, filed on Apr. 10, 2013, which is incorporated herein by reference.

FIELD

The present invention relates to the control of the congestion of network equipment and, more particularly, to a method and apparatus for controlling the congestion of network equipment that are capable of preventing excessive drop of traffic.

BACKGROUND

Generally, network equipment installed at a location where a network, such as an enterprise network or a data center, is connected to an Internet Service Provider (ISP) network, for example, a router, may be subject to congestion because the traffic from the enterprise network to the external ISP network increases depending on the situation of the occurrence of traffic. Furthermore, in the case of a data center, the congestion of traffic occurs because the excessive traffic generated by users who are present inside the external ISP network is concentrated on servers inside the data center.

If such congestion occurs, a congestion control method is employed. A congestion control method functions to process packets when a queue is fully filled with packets and new packets continuously arrive. Representative congestion control methods include Tail Drop, random early detection (RED), and weight random early detection (WRED).

Tail Drop is a method that functions literally to cut a tail off. That is, Tail Drop functions to drop packets arriving after the occurrence of congestion when congestion occurs and packets arrive. Since all packets arriving after the occurrence of congestion, that is, after the reaching of a maximum queue size, are dropped, even traffic of high importance may be lost. Furthermore, since this method is based on the sequence of the arrival of packets, the overall traffic of a specific user may be dropped.

RED is a method that randomly drops packets before the occurrence of congestion. RED sets minimum and maximum threshold values, and performs processing in three modes, that is, no drop, random drop, and tail drop. Below the minimum threshold value, no drop is performed. In the range from the minimum threshold value to the maximum threshold value, random drop is performed in terms of probability. Meanwhile, above the maximum threshold value, 100% drop, that is, tail drop, is performed. Since this method randomly drops packets, there is the possibility of losing important packets and a phenomenon in which only the traffic of a specific user is dropped may occur.

Meanwhile, WRED is a method that assigns weights to the possibilities of dropping packets in order to reduce the disadvantage of RED, that is, the loss of important packets. This method sets the priorities of dropping by classifying individual traffic based on the differentiated services code point (DSCP) and setting different minimum threshold values for corresponding classes. That is, the minimum threshold value for a class of low priority is set to a low value, and thus random drop is performed earlier. In contrast, the minimum threshold value for a class of high priority is set to a high value, and thus the possibility of the occurrence of random drop is kept low. Although this method can partially mitigate the disadvantage of RED, that is, the loss of important traffic, there is still the possibility of losing the traffic of a specific user because this method is applied based on classes.

The conventional congestion avoidance methods have been described above. Although a part of the methods can prevent the loss of important traffic based on classes, there is the strong possibility of individual traffic being unfairly lost because the individual traffic is lost based on probability.

SUMMARY

In view of the above, the present invention provides an apparatus and method for controlling the congestion of network equipment, which, when dropping an excess of arriving traffic upon occurrence of congestion, equally distribute traffic to users and then drop an excess of traffic based on the location of network equipment and the type of congestion, thereby minimizing the dropping of traffic.

In accordance with a first aspect of the present invention, there is provided a method of controlling congestion of network equipment that connects networks with each other, including: determining a type of congestion based on a location of the network equipment; identifying a network connection section having a strong possibility of occurrence of congestion based on the type of congestion, and setting a critical congestion bandwidth that is used to determine the occurrence of congestion; identifying users required for equal distribution of traffic upon occurrence of congestion based on the critical congestion bandwidth; and equally distributing traffic to the identified users based on the critical congestion bandwidth, and then dropping an excess of arriving traffic over the equally distributed traffic, thereby performing avoidance of the congestion.

Further, the determining the type of congestion comprises determining the type of congestion to be an external or internal network output congestion type depending on an amount of traffic that arrives from each of the networks that are connected by the network equipment.

Further, the determining the type of congestion may comprise determining the type of congestion to be an external or internal network output congestion type based on types of apparatuses included in each of the networks that are connected by the network equipment.

Further, the setting the critical bandwidth may comprise: identifying an interface of the network equipment, that is, the network connection section; and setting the critical bandwidth using a Command Line Interface (CLI) of the identified interface.

Further, the setting the critical bandwidth may comprise: setting the critical bandwidth in compliance with Quality of Service (QoS) policies set in the network equipment.

Further, the identifying the users may comprise identifying the users using header information of packets arriving from the users.

Further, header information of the packets may be source or destination addresses of the packets.

In accordance a second aspect of the present invention, there is provided an apparatus for controlling congestion of network equipment that connects networks with each other, including: a congestion type determination unit configured to determine a type of congestion based on a location of the network equipment; a critical bandwidth setting unit configured to identify a network connection section having a strong possibility of occurrence of congestion based on the type of congestion, and to set a critical congestion bandwidth that is used to determine the occurrence of congestion; and a traffic control unit configured to identify users required for equal distribution of traffic upon occurrence of congestion based on the critical congestion bandwidth, and to equally distribute traffic to the identified users based on the critical congestion bandwidth and then drop an excess of arriving traffic over the equally distributed traffic, thereby performing avoidance of the congestion.

Further, the congestion type determination unit may determine the type of congestion depending on an amount of traffic that arrives from each of the networks that are connected by the network equipment.

Further, the congestion type determination unit may determine the type of congestion based on types of apparatuses included in each of the networks that are connected by the network equipment.

Further, the critical bandwidth setting unit may identify an interface of the network equipment, that is, the network connection section, and may set the critical bandwidth using a CLI of the identified interface.

Further, the congestion control apparatus may comprise QoS policies set in the network equipment; and the critical bandwidth setting unit may set the critical bandwidth in compliance with the Quality of Service (QoS) policies set in the network equipment.

Further, the traffic control unit may identify the users using header information of packets arriving from the users.

Further, header information of the packets may be source or destination addresses of the packets.

The method and apparatus for controlling congestion in accordance with the present invention are advantageous in that the unequal traffic transmission of users attributable to the dropping of an excess of traffic unconditionally or based on probability upon occurrence of congestion can be mitigated.

Furthermore, the present invention is advantageous in that users are identified and then overall available traffic is equally distributed to the users, thereby guaranteeing QoS for each of the users.

Moreover, the present invention is advantageous in that the identification of users can be performed based on various methods, that is, the source and destination addresses of packets, and varies depending on the location of a network and the type of congestion traffic, and thus the present invention can flexibly deal with various types of congestion traffic.

BRIEF DESCRIPTION OF THE DRAWINGS

The above and other objects and features of the present invention will become apparent from the following description of embodiments given in conjunction with the accompanying drawings, in which.

DETAILED DESCRIPTION

Figure 1:
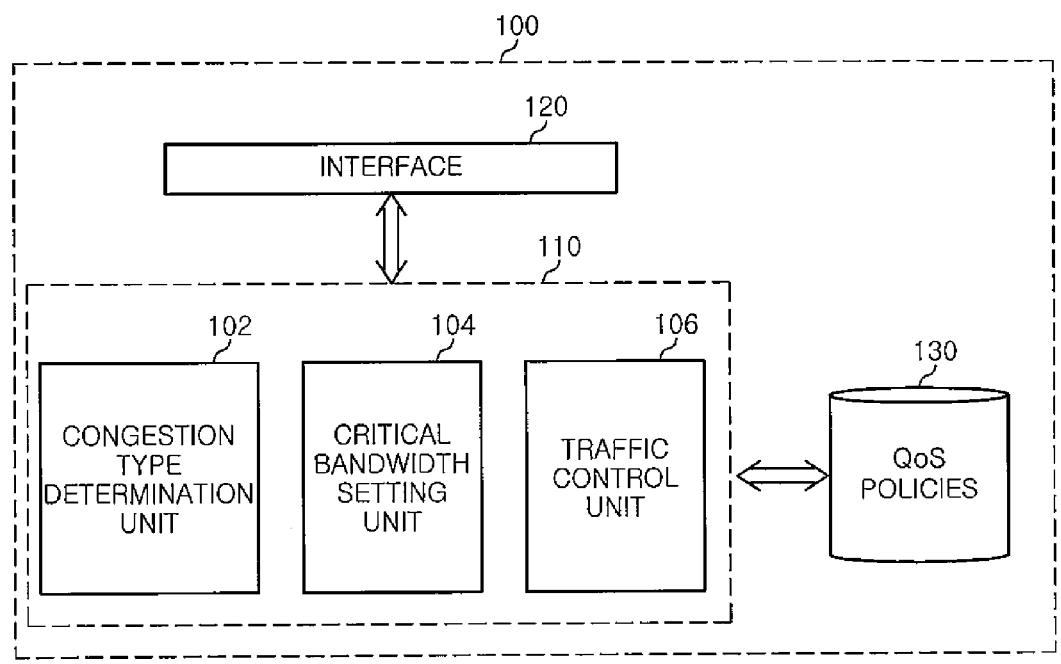
FIG. 1 is a block diagram illustrating the internal configuration of network equipment including a congestion control apparatus in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in detail with reference to the accompanying drawings so that they can be readily implemented by those skilled in the art.

Embodiments of the present invention will be described with reference to the accompanying drawings.

FIG. 1 is a block diagram illustrating the internal configuration of network equipment 100 including a congestion control apparatus according to an embodiment of the present invention. The network equipment 100 may include a congestion control apparatus 110, an interface 120, and QoS policies 130.

The congestion control apparatus 110 of FIG. 1 may include a congestion type determination unit 102 configured to determine the type of occurrence of congestion, a critical bandwidth setting unit 104, and a traffic control unit 106.

Figure 2:
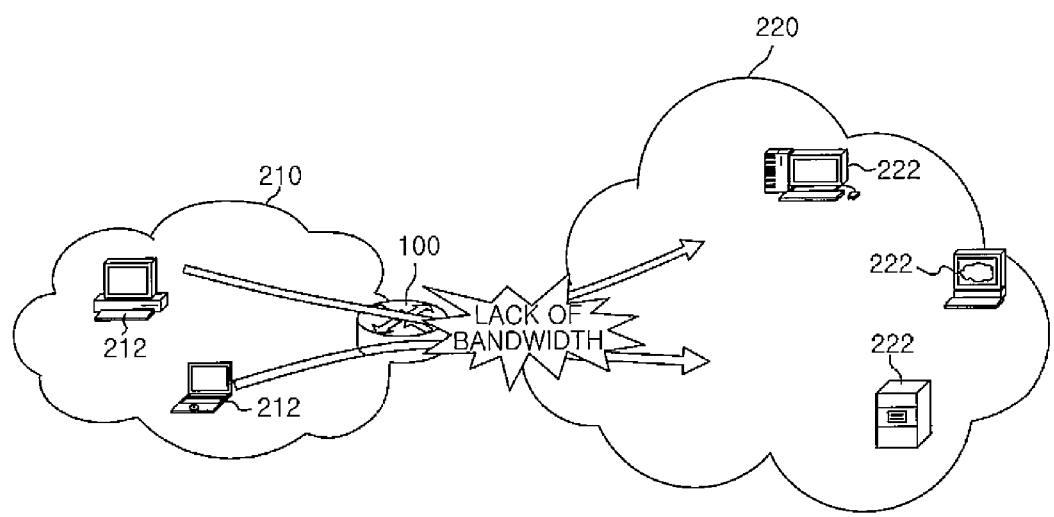
FIGS. 2 and 3 are diagrams illustrating examples of the types of congestion that are applied to an embodiment of the present invention.

The congestion type determination unit 102 may determine the type of occurrence of traffic congestion based on the location of the network equipment 100. That is, when network equipment 100 connects an enterprise network 210 or the like with an ISP network 220, as illustrated in FIG. 2, the terminals 212 of a number of users within the enterprise network 210 connect and communicate with a server or other user terminals 222 within the ISP network 220 via the network equipment 100 of a private network or the enterprise network 210, for example, gateway equipment. In this case, since the bandwidth of a connection section in which a connection is set up from the private network or enterprise network 210 to the ISP network 220 is constant and the traffic of a number of user terminals 202 is concentrated in the connection section, traffic congestion attributable to lack of bandwidth may occur. The congestion type determination unit 102 may determine the traffic congestion illustrated in FIG. 2 to be an external network output congestion type.

Figure 3:
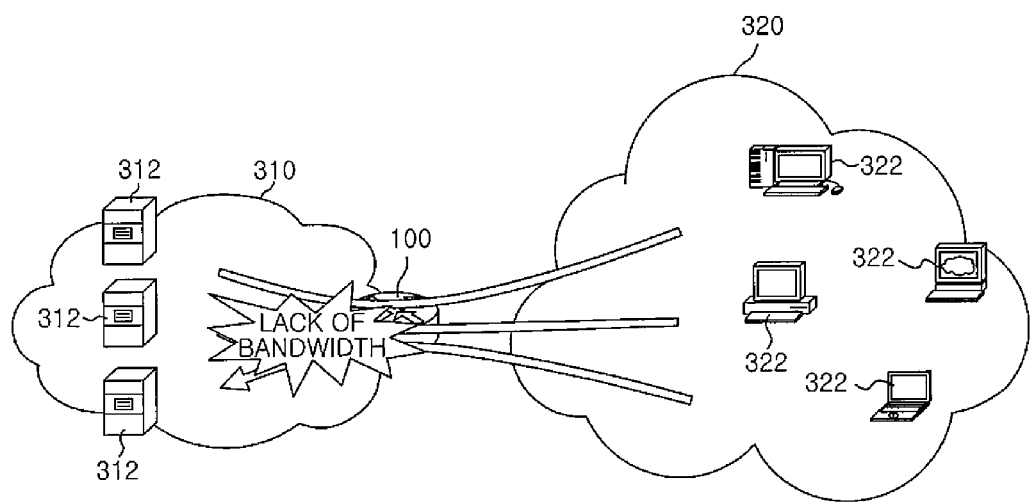

Meanwhile, when a number of user terminals 322 within an ISP network 320 connect and communicate with servers 312 within a data center 310, as illustrated in FIG. 3, the traffic generated by the user terminals 322 within the ISP network 320 enters the data center 310. In this case, excessive traffic is transmitted to network equipment 100 in a place where the servers 312 are located, and thus congestion may occur. The congestion type determination unit 102 may determine this case to be an internal network output congestion type.

As described above, the congestion type determination unit 102 may determine the type of congestion to be an external network output congestion type when the network equipment is present at a location where the network equipment connects the enterprise network or private network 210 with the ISP network 220, and may determine the type of congestion to be an internal network output congestion type when the network equipment is present at a location where the network equipment connects the data center 300 in which the plurality of servers 302 is present with the ISP network 310.

Meanwhile, although the case where the type of congestion is determined based on the network equipment 100 that connects an enterprise network with an ISP network or a data center has been described as an example in this embodiment of the present invention, the congestion type determination unit 102 may determine the type of congestion based on the amount of traffic that is generated by first and second networks connected to the network equipment 100. That is, while the type of congestion may be determined to be an internal network output congestion type when the amount of traffic entering from the first network is large, and the type of congestion may be determined to be an external network output congestion type when the amount of traffic entering from the second network is large, the present invention is not limited thereto.

The critical bandwidth setting unit 104 identifies a network connection section having a strong possibility of congestion based on the congestion type determined by the congestion type determination unit 102, for example, the interface 120 of network equipment, and may set critical congestion bandwidth using a Command Line Interface (CLI). For example, the critical congestion bandwidth may be set for a connection section in which traffic is output from the network equipment 100 to an external network if the type of congestion is an external network congestion type, and the critical congestion bandwidth may be set for a connection section in which traffic enters from an external network and is output to an internal network when the congestion type is an internal network congestion type. In this case, the critical congestion bandwidth is used to determine the congestion of an interface, and may be equal to or lower than the maximum physical speed of the interface.

Furthermore, in this embodiment of the present invention, the interface 120 is a place where traffic enters or is transmitted. A network port may be taken as an example of the interface 120.

Meanwhile, when the critical bandwidth setting unit 104 sets the critical congestion bandwidth, it may set the critical congestion bandwidth based on stored QoS policies 130. That is, after traffic has been assigned, the critical congestion bandwidth may be set in compliance with the QoS policies 130 having preset priorities. For example, if about 30-50% of the bandwidth of the interface 120 is effective in compliance with the QoS policy 130 having a high priority, the critical congestion bandwidth may be set to 30-50% of the bandwidth.

The traffic control unit 106 may perform the equal distribution of traffic to users to avoid congestion if traffic exceeding the critical congestion bandwidth is generated. For example, in the case of FIG. 2, when traffic is lost because of lack of bandwidth, congestion may be avoided by equally distributing traffic to the user terminals 212 within the enterprise network 210. That is, in the case of FIG. 2, the traffic control unit 106 may identify users based on the source addresses of packets received from the user terminals 212 within the enterprise network 210, and may then perform the avoidance of congestion.

In the case of FIG. 3, traffic that is generated by the terminals 322 of a number of users within the ISP network 320 is concentrated on the servers 312 within the data center 310, and thus the avoidance of congestion may be achieved by equally distributing traffic to the servers 312. That is, in the case of FIG. 3, the traffic control unit 106 may identify users based on the destination addresses of packets received from the terminals 322 within the ISP network 320, and may then perform the avoidance of congestion.

Although the case where users are identified using the source and destination addresses of packets in order to avoid congestion has been described as an example in this embodiment of the present invention, users may be identified based on at least one of various items, such as a protocol and the headers of IP packets or based on the combination of two or more of the items.

A process in which the congestion control apparatus 110 configured as described above controls traffic based on the type of congestion will be described with reference to FIG. 4.

Figure 4:
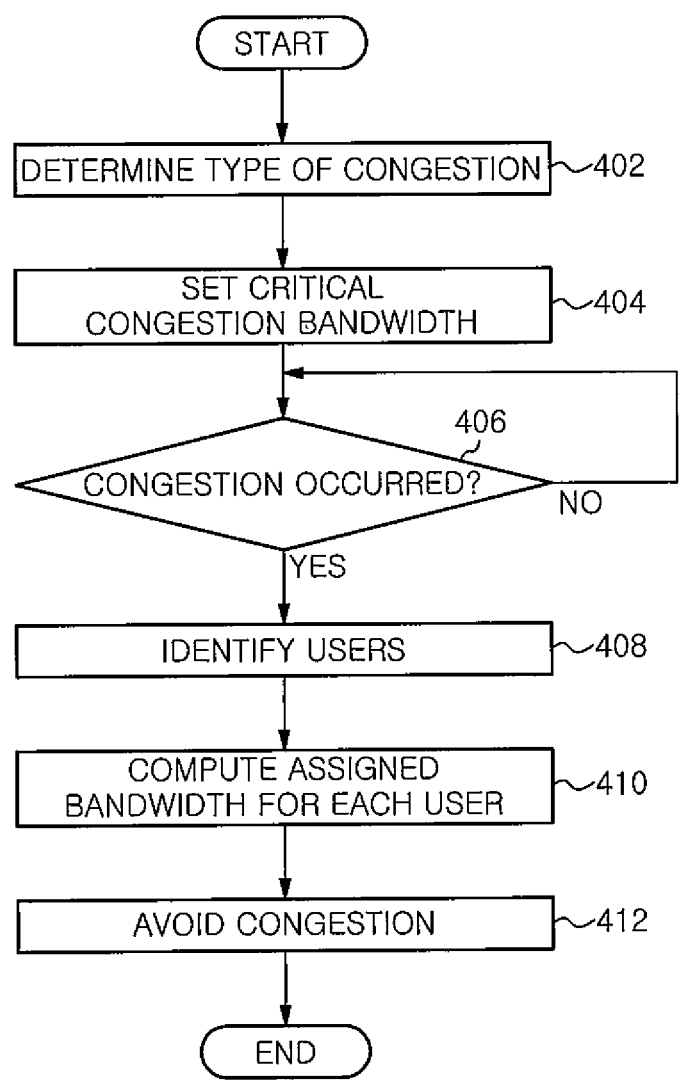
FIG. 4 is a flowchart illustrating a process in which network equipment controls traffic in accordance with an embodiment of the present invention.

FIG. 4 is a flowchart illustrating a process of controlling traffic based on the type of congestion in accordance with an embodiment of the present invention.

First, as illustrated in FIG. 4, the congestion type determination unit 102 determines the type of congestion based on the location of the network equipment 100 at step 402. That is, the type of congestion is determined based on whether the network equipment 100 is present at a location where the network equipment 100 connects the enterprise network 210 with the ISP network 220, as illustrated in FIG. 2 or at a location where the network equipment 100 connects the center 310 with the ISP network 320, as illustrated in FIG. 3.

Although the case where the type of congestion is determined based on the location of the network equipment 100 has been described as an example in this embodiment of the present invention, the type of congestion may be determined by the administrator of the network equipment 100, or may be determined based on the amount of traffic between the networks connected to the network equipment 100.

Thereafter, the critical bandwidth setting unit 104 identifies the interface 120 based on the type of congestion and sets a critical congestion bandwidth using a CLI at step 404. In this case, the critical bandwidth setting unit 104 may set the critical congestion bandwidth in compliance with the QoS policies 130 having priority while taking into account the amount of traffic that is processed through the interface 120.

Thereafter, the traffic processing unit 106 determines whether congestion has occurred through the comparison between the amount of traffic arriving or transmitted via the interface 120 and the critical congestion bandwidth at step 406.

If, as a result of the determination at step 406, it is determined that congestion has occurred, the traffic processing unit 106 performs user identification at step 408. Users are identified based on the destination addresses of packets arriving from an external network if the type of congestion is an internal network congestion type. In contrast, users are identified based on the source addresses of packets arriving from an internal network if the type of congestion is an external network congestion type.

Once the users have been identified, the traffic processing unit 106 computes an assigned bandwidth for each of the users based on the critical congestion bandwidth and the number of identified users at step 410. For example, if the critical congestion bandwidth is 900 Mbps and the number of identified users is 90, the assigned bandwidth may be 10 Mbps.

Thereafter, the traffic processing unit 106 avoids congestion by processing traffic arriving at or transmitted to each user based on a corresponding assigned bandwidth at step 412. That is, congestion is avoided by dropping an excess of traffic over the assigned bandwidth.

Meanwhile, while performing the avoidance of congestion, the traffic processing unit 106 may check the critical congestion bandwidth at preset time intervals and determine whether congestion has occurred again.

The method and apparatus for controlling congestion in accordance with the present invention are advantageous in that the unequal traffic transmission of users attributable to the dropping of an excess of traffic unconditionally or based on probability upon occurrence of congestion can be mitigated.

Furthermore, the present invention is advantageous in that users are identified and then overall available traffic is equally distributed to the users, thereby guaranteeing QoS for each of the users.

Moreover, the present invention is advantageous in that the identification of users can be performed based on various methods, that is, the source and destination addresses of packets, and varies depending on the location of a network and the type of congestion traffic, and thus the present invention can flexibly deal with various types of congestion traffic.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method of controlling congestion of network equipment that connects networks with each other, comprising:
   determining a type of congestion based on types of the network equipment;
   identifying a network connection section having a strong possibility of occurrence of congestion based on the type of congestion, and setting a critical congestion bandwidth that is used to determine the occurrence of congestion;
   identifying users required for equal distribution of traffic upon occurrence of congestion based on the critical congestion bandwidth; and
   equally distributing traffic to the identified users based on the critical congestion bandwidth, and then dropping an excess of arriving traffic over the equally distributed traffic, thereby performing avoidance of the congestion.

2. The method of claim 1, wherein said determining the type of congestion comprises determining the type of congestion to be an external or internal network output congestion type depending on an amount of traffic that arrives from each of the networks that are connected by the network equipment.

3. The method of claim 1, wherein said determining the type of congestion comprises determining the type of congestion to be an external or internal network output congestion type based on types of apparatuses included in each of the networks that are connected by the network equipment.

4. The method of claim 1, wherein said setting the critical bandwidth comprises:
   identifying an interface of the network equipment, that is, the network connection section; and
   setting the critical bandwidth using a Command Line Interface (CLI) of the identified interface.

5. The method of claim 1, wherein said setting the critical bandwidth comprises:
   setting the critical bandwidth in compliance with Quality of Service (QoS) policies set in the network equipment.

6. The method of claim 1, wherein said identifying the users comprises identifying the users using header information of packets arriving from the users.

7. The method of claim 6, wherein header information of the packets includes source or destination addresses of the packets.

8. An apparatus for controlling congestion of network equipment that connects networks with each other, comprising:
   a congestion type determination unit configured to determine a type of congestion based on types of the network equipment;
   a critical bandwidth setting unit configured to identify a network connection section having a strong possibility of occurrence of congestion based on the type of congestion, and to set a critical congestion bandwidth that is used to determine the occurrence of congestion; and
   a traffic control unit configured to identify users required for equal distribution of traffic upon occurrence of congestion based on the critical congestion bandwidth, and to equally distribute traffic to the identified users based on the critical congestion bandwidth and then drop an excess of arriving traffic over the equally distributed traffic, thereby performing avoidance of the congestion.

9. The apparatus of claim 8, wherein the congestion type determination unit determines the type of congestion depending on an amount of traffic that arrives from each of the networks that are connected by the network equipment.

10. The apparatus of claim 8, wherein the congestion type determination unit determines the type of congestion based on types of apparatuses included in each of the networks that are connected by the network equipment.

11. The apparatus of claim 8, wherein the critical bandwidth setting unit identifies an interface of the network equipment, that is, the network connection section, and sets the critical bandwidth using a CLI of the identified interface.

12. The apparatus of claim 8, wherein:
   the congestion control apparatus comprises QoS policies set in the network equipment; and
   the critical bandwidth setting unit sets the critical bandwidth in compliance with the Quality of Service (QoS) policies set in the network equipment.

13. The apparatus of claim 8, wherein the traffic control unit identifies the users using header information of packets arriving from the users.

14. The apparatus of claim 13, wherein header information of the packets includes source or destination addresses of the packets.

* * * * *